(12) United States Patent
Sanchez et al.

(10) Patent No.: US 9,060,531 B2
(45) Date of Patent: Jun. 23, 2015

(54) LAMINATED BAKED SNACK BAR

(75) Inventors: Velvet Sanchez, Monterrey (MX); Roberto Garcia de Alba, San Pedro Garza Garcia (MX); Jesus Villanueva, Co. Villa Montaña (MX)

(73) Assignee: Corporativo Internacional Mexicano, S. de R.L. de C.V., Col. Industrial Vallejo (MX)

( * ) Notice: Subject to any disclaimer, the term of this patent is extended or adjusted under 35 U.S.C. 154(b) by 1137 days.

(21) Appl. No.: 11/932,111

(22) Filed: Oct. 31, 2007

(65) Prior Publication Data

US 2009/0110780 A1    Apr. 30, 2009

(51) Int. Cl.
A23L 1/00 (2006.01)
A21D 13/00 (2006.01)

(52) U.S. Cl.
CPC .......... *A23L 1/0067* (2013.01); *A21D 13/0006* (2013.01); *A21D 13/0022* (2013.01)

(58) Field of Classification Search
CPC A23V 2002/00; A23L 1/1643; A23L 1/1641; A23L 1/0067; A23L 1/0524; A23L 2/52; A23L 1/3056; A23L 1/0522; A21D 13/0022; A21D 13/0006; A21D 13/0041; A21D 13/08; A21D 13/0054; A21D 13/0061; A21D 13/0064; A21D 13/008
USPC .......................................................... 426/96
See application file for complete search history.

(56) References Cited

U.S. PATENT DOCUMENTS

| | | | |
|---|---|---|---|
| 3,366,485 A | 1/1968 | Moen et al. | |
| 3,903,308 A | 9/1975 | Ode | |
| 4,020,188 A | 4/1977 | Forkner | |
| 4,207,348 A | 6/1980 | Vermilyea et al. | |
| 4,741,908 A | 5/1988 | Brooks et al. | |
| 5,723,164 A | 3/1998 | Morano | |

(Continued)

FOREIGN PATENT DOCUMENTS

| | | |
|---|---|---|
| CN | 1457672 | 11/2003 |
| CN | 1781378 | 6/2006 |

(Continued)

OTHER PUBLICATIONS

Bluberry Crisp with Oatmeal and Almond Topping, Bon Appetit, Aug. 2001.*

(Continued)

*Primary Examiner* — Michele L Jacobson
*Assistant Examiner* — Hong T Yoo
(74) *Attorney, Agent, or Firm* — James R. Gourley; Carstens & Cahoon, LLP

(57) ABSTRACT

A laminated baked snack bar includes a layer of low moisture filling laminated between two thin layers of dough. The dough layers of the snack bar have a crunchy, cracker-like texture while the filling layer remains soft. The total thickness of the baked snack bar is preferably less than 7 millimeters. The snack bar is prepared by calibrating dough sheets to a thickness of less than 1 millimeter each, followed by depositing a filling composition having a high heat resistant stability on one of the calibrated dough sheets and placing a second calibrated dough sheet on top of the filling to form a laminate. The laminate is then calibrated, cut into bars and baked, using a mild baking profile. The snack bar may have a design molded on the top surface and/or a topping composition, preferably including oats, deposited on the laminate.

16 Claims, 3 Drawing Sheets

(56) References Cited

U.S. PATENT DOCUMENTS

| | | | |
|---|---|---|---|
| 6,267,998 B1 | 7/2001 | Bauman et al. | |
| 6,287,622 B1 * | 9/2001 | Martinez-Serna Villagran et al. | 426/549 |
| 6,299,916 B1 | 10/2001 | Dally et al. | |
| 6,479,090 B1 | 11/2002 | Carey et al. | |
| 6,528,104 B1 * | 3/2003 | Jindra et al. | 426/321 |
| 6,592,915 B1 * | 7/2003 | Froseth et al. | 426/93 |
| 7,097,870 B2 | 8/2006 | Funk et al. | |
| 2002/0051837 A1 | 5/2002 | Beharry | |
| 2002/0068115 A1 | 6/2002 | Hayes-Jacobson | |
| 2003/0091697 A1 | 5/2003 | Froseth et al. | |
| 2004/0126477 A1 | 7/2004 | Coleman et al. | |
| 2004/0185158 A1 | 9/2004 | McHugh et al. | |
| 2005/0175739 A1 | 8/2005 | Solbach et al. | |
| 2005/0202125 A1 | 9/2005 | Bosch et al. | |
| 2005/0202142 A1 | 9/2005 | Bosch et al. | |
| 2005/0249845 A1 | 11/2005 | Mihalos et al. | |
| 2005/0287249 A1 | 12/2005 | Shukla et al. | |
| 2006/0051482 A1 | 3/2006 | Thorpe | |
| 2006/0078660 A1 | 4/2006 | Martin | |
| 2007/0148289 A1 | 6/2007 | Gautam et al. | |

FOREIGN PATENT DOCUMENTS

| | | | |
|---|---|---|---|
| JP | 2002 051688 | | 2/2002 |
| JP | 2004016146 | * | 1/2004 |
| WO | 2007/041679 | | 4/2007 |

OTHER PUBLICATIONS

Oki, Derwent abstract of JP-2004016146.*

International Search Report in related International Patent Application No. PCT/IB2008/002933, dated Jun. 30, 2009.

Charles, et al., "Role of Intact Starch Granules and Gluten on Texture of Taiwanese Flaky Snack," Journal of Texture Studies, vol. 35, No. 3, 2004, pp. 311-323.

Srisawas, et al., "Acoustic Testing of Snack Food Crispness Using Neural Networks," Journal of Texture Studies, vol. 34, 2003, pp. 401-420.

Vickers, et al., "Relationships Between Sensory Crispness and Other Sensory and Instrumental Parameters," Journal of Texture Studies, vol. 11, 1980, pp. 291-307.

Mazumder, et al., "Textural Attributes of a Model Snack Food At Different Moisture Contents,"Journal of Food Engineering, Barking, Essex, GB, vol. 79, No. 2, Mar. 1, 2007, pp. 511-516.

Roudaut, et al., "Crispness: A Critical Review on Sensory and Material Science Approaches," Trends in Food Science and Technology, Elsevier Science Publishers, GB, vol. 13, No. 6-7, Jun. 1, 2002, pp. 217-227.

Office Action in related Canadian Patent Application No. 2,701,058 dated Jul. 26, 2011.

Office Action in related British Patent Application No. GB1008545.4 dated Nov. 30, 2011.

http://ciao.co.uk/Reviews/McVities_Go_Ahead_Crispy_Slices_5642859, originally accessed Nov. 29, 2011, last accessed Jan. 20, 2012.

http://www.tesco.com/groceries/Product/Details/?id=266304867, originally accessed Nov. 29, 2011, last accessed Jan. 20, 2012.

Office Action in related Chinese Patent Application No. 200880119028; dated Jan. 31, 2013.

* cited by examiner

LAMINATED BAKED SNACK BAR

FIELD OF THE INVENTION

This invention relates to snack bars. In particular, this invention relates to laminated baked snack bars having a filling that includes fruit.

BACKGROUND OF THE INVENTION

It has long been known to produce snack foods of various compositions. Improved and new compositions are desirable to meet changing market demands. In particular, there is perceived market demand for low calorie snack foods having pleasant taste, appearance, and texture. For example, numerous different soft baked bars with a fruit filling are commercially available.

Dough sheeting is a common method for producing layers of dough for baked products including cookies, crackers, pastries, biscuits, pasta, cereal pieces, pizza crusts and various other similar items. Sheets of dough may be produced by depositing generally homogeneously mixed dough onto a conveyor belt and feeding it between at least two counter-rotating rollers that each extend across the conveyor width. The rollers compress the dough into a sheet of predetermined thickness and the dough sheet is transported by the moving conveyor belt for further processing.

Dough sheets may be reduced to a specific thickness by the process of calibration. Calibration involves passing a dough sheet through a set of counter-rotating rollers set an exact distance from each other. The thickness of the calibrated dough sheet may be monitored, for example by a laser probe. The measurement is performed to ensure that the dough sheet is being accurately calibrated and the gap between the rollers can be adjusted as needed.

Lamination is the process of creating a laminate, which is an item that has two or more layers joined together. The layers may be composed of the same materials, such as wood pieces in plywood, or different materials, such as plastic film heat bonded around a sheet of paper. In the food industry, a laminated snack bar may include a layer of fruit filling compressed between two layers of dough sheets.

Thus, while snack food structures and compositions according to the prior art provide a number of advantageous features, they nevertheless have certain limitations. For example, a common problem with laminated, filled food products, such as snack bars, is that moisture from the filling is often absorbed by the adjacent dough layers. This is normally undesirable as the dough layers become soggy. The present invention seeks to overcome certain of these limitations and other drawbacks of the prior art, and to provide new features not heretofore available. Accordingly it is desirable to provide a laminated low calorie snack bar that simultaneously includes cracker-like layers of dough and a moist middle layer of filling. The filling remains soft without causing the crunchy dough layers to become soggy. Additional features and advantages of the invention or of certain embodiments of the invention will be apparent to those of skill in the art from the following disclosure and description of exemplary embodiments.

SUMMARY OF THE INVENTION

In accordance with a first aspect, a laminated baked snack bar is provided. Certain exemplary embodiments of the snack bar disclosed herein comprise two layers of crunchy dough with a moist layer of filling between the dough layers. The total thickness of the snack bar may be less than 7 millimeters.

In accordance with another aspect, a dough composition is provided that exhibits a cracker-like texture upon baking. The dough composition preferably includes wheat flour, oat flour, modified starch and enzyme.

In accordance with a further aspect, a filling composition is provided that maintains softness and over ninety percent of its mass upon baking. The filling composition has a high solid content and may comprise fruit.

In accordance with yet another aspect, a method for preparing a baked snack bar comprises the steps of calibrating dough sheets to a thickness of less than 1 millimeter each, followed by depositing a filling composition on one of the calibrated dough sheets and laying a second calibrated dough sheet on top of the filling. The laminate is then calibrated, cut into bars and baked, using a mild baking profile. Certain exemplary embodiments of the method disclosed herein also comprise molding a design on the top of the laminate and/or depositing a topping composition on the laminate.

BRIEF DESCRIPTION OF THE DRAWINGS

FIG. 2b is a cross-section of a portion of the design taken along lines 2b-2b of FIG. 2a.

DETAILED DESCRIPTION OF EMBODIMENTS OF THE INVENTION

It should be understood that the snack bar in accordance with this disclosure may have any of numerous different specific formulations or constitutions. The formulation of a snack bar may vary to a certain extent, depending upon such factors as the product's intended market segment, its desired nutritional characteristics, flavor profile and the like. For example, flavorings, sweeteners, vitamins, preservatives, and/or coloring agents may be added to any of the formulations to vary the taste, texture, nutritional characteristics, etc. In general, a snack bar in accordance with this disclosure typically includes dough comprising at least flour, water, starch, enzyme, fat and a leavening agent. The snack bar also includes a low moisture filling composition, which typically comprises sweeteners, fruit, glycerin, starch and pectin. Alternatively, a savory filling composition may be used in the snack bar. Additional and alternative suitable ingredients will be recognized by those skilled in the art given the benefit of this disclosure.

Figure 1:
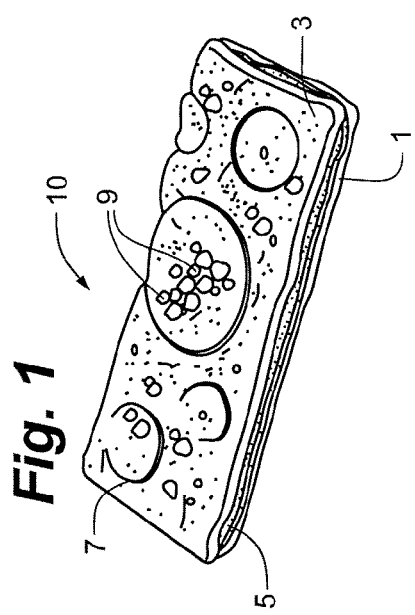
FIG. 1 is a perspective view of a laminated baked snack bar of an embodiment of the invention.

Referring to FIG. 1, a perspective view of an embodiment of the invention is provided. Snack bar 10 illustrated in FIG. 1 includes a first dough layer 1 and a second dough layer 3, which form the bottom and top layers of the bar 10, respectively. A filling layer 5 is disposed between the two dough layers 1, 3, and substantially completely fills the area in between the two layers 1, 3. As shown in the figure, the filling is visible from the side of the bar 10 and extends towards the edges of the dough layers. Further, the bar 10 may comprise a topping 9 and/or a shine composition (not shown) added to the top of the bar 10. The topping 9 preferably includes oats, such as toasted oats and oat flakes, which may be affixed to the bar 10 with the shine composition. The dough layers 1, 3 may comprise oat flour to provide a total of over 3 grams of oats per snack bar. An entire 25-gram snack bar 10 may provide less than 100 calories.

Figure 2C:
FIG. 2c is a cross-section of another portion of the design of FIG. 2a taken along lines 2c-2c.
Figure 2B:
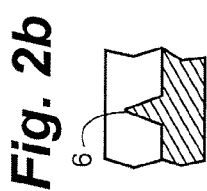
Figure 2A:
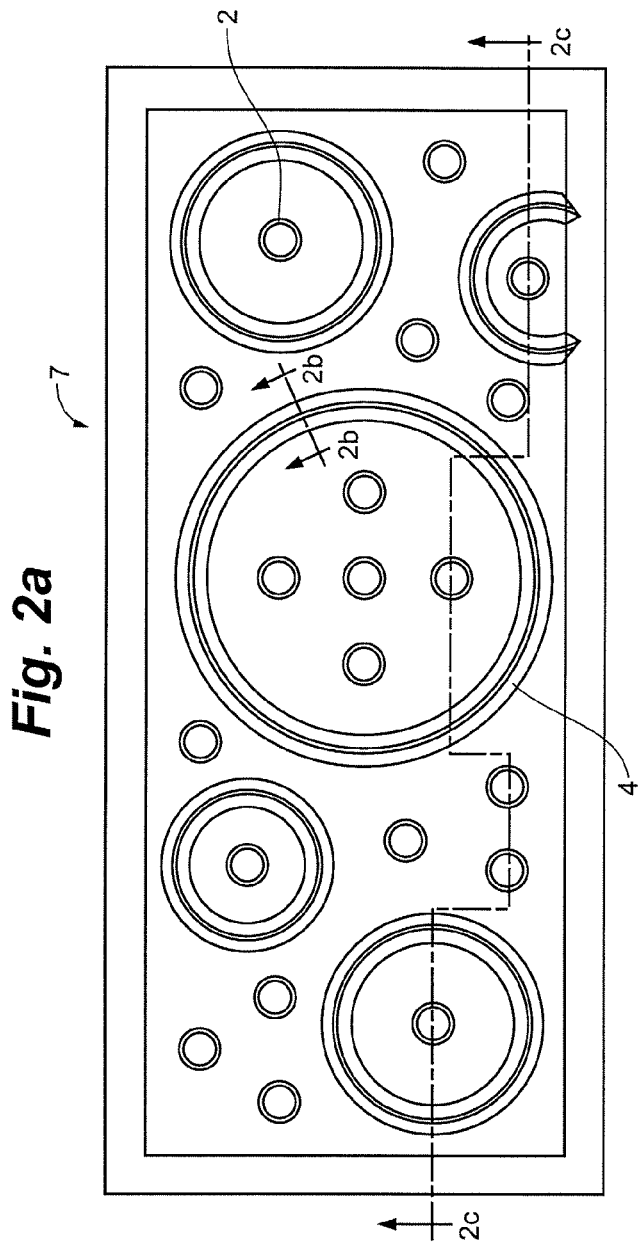
FIG. 2a is a plan view of a mold design for applying a pattern to the top of a snack bar in accordance with an embodiment of the invention.

Optionally, a design 7 may be molded on top of the dough layer 3. (FIG. 1) The design 7 is shown in more detail in the form of a mold design shown in FIG. 2a, although any conceivable design may be molded onto the bar 10. FIG. 2a illustrates a design 7 that comprises a plurality of circles 2 and rings 4. The view of the cross-section shown in FIG. 2b indicates the varying topography that may be achieved with dough molding. Similarly, the view of the cross-section shown in FIG. 2c shows that design 7 includes angled projections 6 in the center of the rings 4.

The dough recipe must provide dough capable of being sheeted and calibrated to a thickness of less than 1 millimeter for use in the snack bar 10. Further, the dough layers 1 and 3 are made from a dough composition that comprises at least flour, modified starch and enzyme. The amount of flour, such as wheat flour, present in the dough composition ranges between about 30% and 80% by weight of the total dough composition. The modified starch included in the dough composition is between about 3% and 20% by weight of the total dough composition. For example, the modified starch may be a waxy maize starch. Any suitable pentosan-degrading enzyme may be included in the dough composition in an amount between about 0.1% and 0.4% by weight of the total dough composition. The enzyme may be added as a dilute solution, such as a solution containing one part by weight of an enzyme concentrate and nine parts by weight of water. Preferably, the dough composition does not include shortening that comprises trans fat. Table 1 provides many of the ingredients of the dough composition of one exemplary embodiment of the snack bar.

TABLE 1

| Dough Composition Ingredients | |
|---|---|
| Ingredients | Weight percent |
| Water | 17.0% |
| Wheat flour | 45.28% |
| Oat flour | 11.32% |
| Modified starch | 5.15% |
| Enzyme | 0.01% |
| Wheat gluten | 1.04% |
| Inulin | 3.22% |
| Sugar | 3.66% |
| Fat | 7.7% |
| Leavening agent | 0.9% |
| Yeast | 0.04% |
| Salt | 0.89% |
| Emulsifier | 0.26% |
| Flavoring | 0.23% |

The dough layers 1 and 3, when baked, exhibit a cracker-like texture, which may be determined qualitatively by a sensory panel using a system such as Qualitative Descriptive Analysis (QDA) and/or quantitatively by measuring the weight required to fracture the dough layer. The weight required to break the dough layers 1 and 3, which have a cracker texture, ranges between about 0.09 kg and 1.40 kg.

As discussed above, the filling layer 5 of the snack bar 10 may be either sweet or savory. In an embodiment, the filling layer 5 may comprise fruit, such as strawberry and/or apple, prune, pineapple, peach or cranberry. Importantly, the filling composition has a high solid content and a low moisture level, which assist to minimize moisture transfer from the filling layer 5 to the dough layers 1 and 3, thereby maintaining the crunchy texture of the baked dough layers 1 and 3. The filling composition preferably includes between about 75% and 80% solids, less than 2% water, and a low water activity, such as between about 0.56 and 0.65. The solids may be provided by several of the filling composition ingredients, such the fruit, pectin, sugar, starch, etc. Further, fruit or vegetable pieces or inclusions that have a moisture content below about 5.5% may also be included in the filling. Some examples of inclusions include raisins, dried cranberries, dried apple pieces and dried tomato pieces. Similar to the dough composition, the filling composition preferably does not include any source of trans fat. Table 2 below includes various ingredients for a fruit filling composition of one embodiment of the snack bar.

TABLE 2

| Fruit Filling Composition | |
|---|---|
| Ingredients | Weight percent |
| Sugar | 27.97% |
| Fructose | 24.12% |
| Glycerin | 12.0% |
| Strawberry | 10.0% |
| Apple | 7.0% |
| Dextrose | 8.73% |
| Modified starch | 5.50% |
| Pectin | 1.35% |
| Citric acid | 0.75% |
| Water | 0.89% |

The presence of pectin, starch and, optionally, gum stabilizers, may contribute to the high resistant heat stability (RHS) of the filling composition. RHS is defined as the percent of a composition's mass that remains following baking, thus a filling composition with an RHS value of 90% would lose 10% of its mass during the baking process. The RHS of the filling composition used for the filling layer 5 must be at least 90%, and preferably at least 97%. Further, the filling composition in the filling layer 5 advantageously does not expand beyond the edges of the dough layers 1 and 3 during baking. The pectin, starch and optional gum stabilizers also serve to help retain moisture within the filling layer 5 and are a contributing factor to the low water activity of the filling composition. This is important because the moisture retention prevents the filling layer 5 from drying out and the dough layers 1, 3 from becoming soggy over time.

Figure 3:
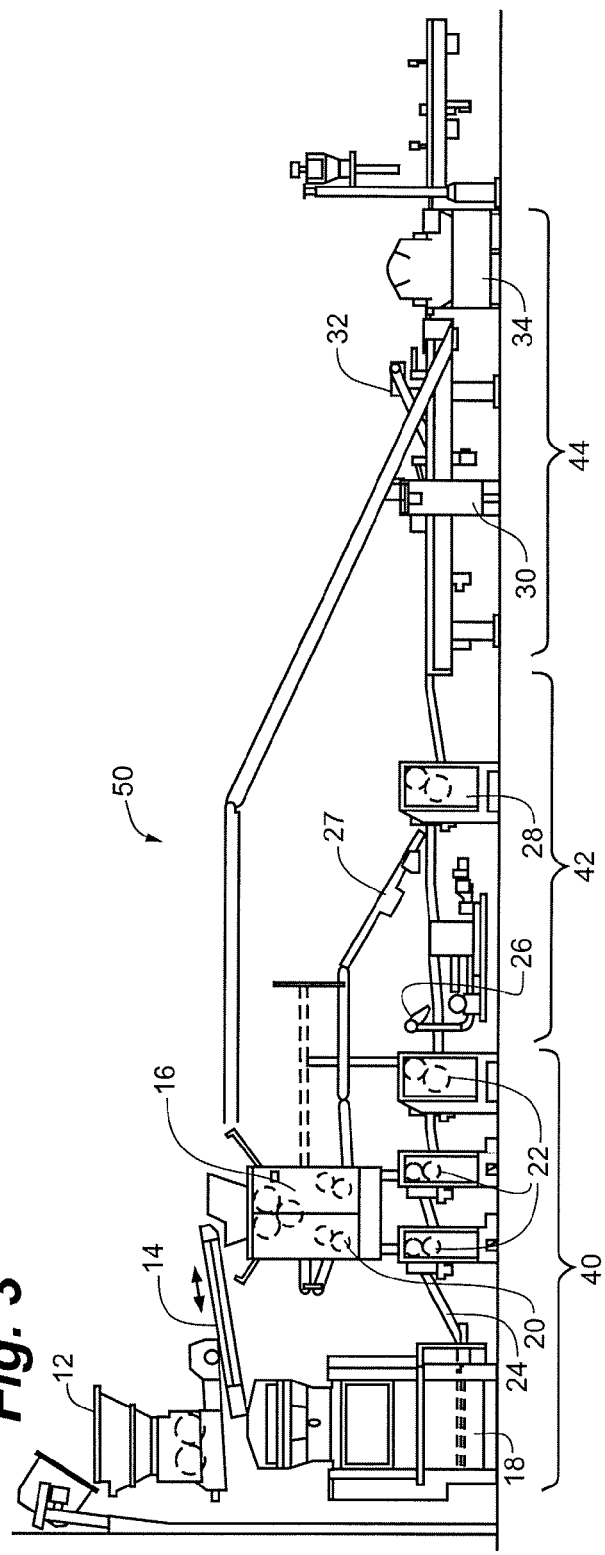
FIG. 3 is a side elevation view of an apparatus that may be employed to prepare a laminated baked snack bar in accordance with an embodiment of the invention.

Embodiments of the baked snack bar 10 may be produced by employing, for example, the apparatus system 50 illustrated in FIG. 3. The system 50 generally includes a calibration section 40, a lamination section 42 and a finishing section 44. The calibration section 40 typically comprises a dough delivery unit 12, a dough distributor 14, first and second dough sheeting formers 16 and 18, and a plurality of calibrating rollers 20 and calibration units 22. Preferably, the dough is transported throughout the apparatus system 50 using a plurality of conveyors 24, but any suitable equipment or method may be employed to transfer the dough layers between the different elements of the apparatus system 50.

In the calibration section 40, substantially homogeneously mixed dough is first provided to the dough delivery unit 12. The delivery unit 12 transfers the dough to the dough distributor 14, which then diverts a first portion of the dough to a first dough sheeting former 16 and a second portion of the dough to a second dough sheeting former 18. As shown, the first dough sheeting former 16 may also contain two or more calibrating rollers 20. When the first dough portion goes through the first dough sheeting former 16, a first dough sheet is produced. The calibrating rollers 20 then reduce the thickness of the first dough sheet to below 1 millimeter (mm), optionally to below 0.9 mm or to about 0.83 mm, forming a first calibrated dough layer.

The calibrating rollers may optionally be located in a separate calibration unit 22 as illustrated in conjunction with the second dough sheeting former 18. The second dough portion goes through the second dough sheeting former 18, and a second dough sheet is produced. The second dough sheet may be transported away from the former 18 by a conveyor 24 and carried to the calibration unit 22. Further, a dough sheet may be calibrated multiple times. FIG. 3 shows three calibration units 22 in sequence and separated by conveyors. The calibration units 22 reduce the thickness of the second dough sheet to below 1 mm, optionally to below 0.9 mm or to about 0.83 mm, forming a second calibrated dough layer.

Figure 4:
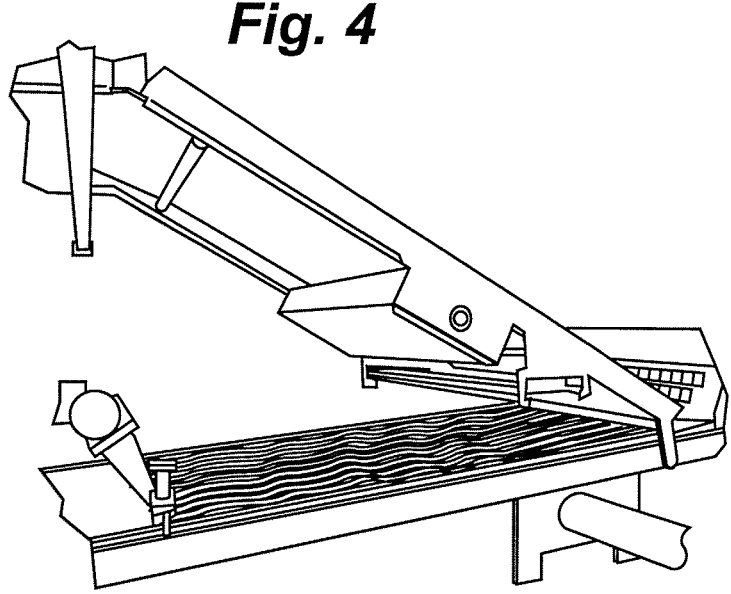
FIG. 4 is a partial perspective view of an apparatus used to perform a step of the method to form the snack bar wherein a filling composition is applied to a dough layer in accordance with an embodiment of the invention.
Figure 5:
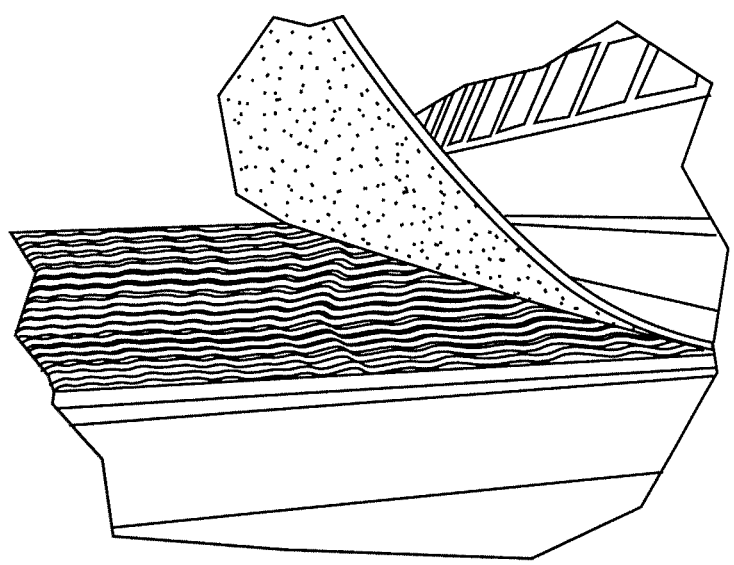
FIG. 5 is a partial close-up perspective view of the apparatus shown in FIG. 4, wherein a dough layer is applied over a filling layer.

Next, the first and second calibrated dough layers are conveyed to the lamination section 42. The lamination section 42 generally comprises at least one filling depositor 26, a dough layer feeder 27 and a calibration unit 28. Referring to FIG. 4, a filling is deposited on the calibrated second layer as it passes below one or more filling depositors 26. In an embodiment, the filling is deposited in a series of long rows located adjacent to each other across the width of the calibrated second dough layer, however any suitable method may be used to deposit the filling on the second calibrated dough layer to substantially completely cover the surface of the dough layer. The first calibrated dough layer is transported, preferably from above, and fed by the dough layer feeder 27 to lie on top of the second calibrated dough layer and filling and form a laminate. FIG. 5 shows a close-up view of the formation of the laminate according to an embodiment. Referring again to FIG. 3, the laminate of first calibrated dough layer/filling/second calibrated dough layer next undergoes calibration in a calibration unit 28, which gently reduces the thickness of the laminate to less than 4 mm, and preferably to about 3.65 mm.

The finishing section 44 typically comprises a cutter 30, a belt feeder 32 and a shine applicator 34. The calibrated laminate is transported to a cutter 30, which includes thin blades to separate the laminate into individual pieces, such as bars. The cutter 30 optionally further comprises a design mold for impressing a design on the top surface of the laminate at the same time that the laminate is cut into bars. As discussed above, FIG. 2a illustrates a sample design and FIG. 1 shows a snack bar 10 that has been impressed with the design of FIG. 2a. In certain embodiments, the topping 9 is added to the laminate bars using a belt feeder 32 or a hopper (not shown). Also optional is the application of a shine composition in shine applicator 34. The shine composition may be comprised of milk protein, water and sugar and may function to secure the topping 9 to the surface of the bar 10.

The laminated bars 10 are baked in an oven, such as a convection oven. During baking, moisture is expelled from the laminated bars 10 via holes docked in the calibrated dough layers to avoid the generation of air caverns within the bars. The amount of moisture given off by the laminated bars 10 during baking is also minimized through the use of a mild baking profile designed to prevent the filling composition from boiling. The bars 10 are initially baked at about 95° C., then the temperature is slowly raised to between about 210-220° C. over the baking time, which may be approximately eleven minutes. The final moisture content of the bar 10 is typically between about 8% and 10% and the final thickness of the bar 10 is preferably less than 7 mm.

To minimize breakage of the dough layers 1 and 3 following baking, the bar 10 is cooled slowly once it has been removed from the baking oven. The bar 10 may be cooled for about 10 to 15 minutes in a cooling tunnel, in which the bar 10 comes into contact with dry air having, for example, a temperature of about 10° C. to 15° C. Prior to packaging, the bar 10 must be cooled to about 42° C. to 47° C., after which the laminated baked snack bars 10 may be individually packed through magazines.

An advantage of embodiments of the laminated snack bar 10 described herein is that it achieves a balance of both appealing taste and texture. The dough layers are thin and crunchy, similar to crackers, while the filling remains moist and flavorful. The use of a filling composition with a low water activity assists to retain the moisture within the filling layer, which prevents the crunchy dough layers from absorbing moisture from the filling and becoming soggy.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

What is claimed is:

1. A baked snack bar comprising:
a first dough layer;
a second dough layer, the first and second dough layers each comprising wheat flour, modified starch and enzyme; and
a filling layer comprising a plurality of solids provided only by components selected from the group consisting of at least one fruit, starch, modified starch, pectin, inclusion pieces, at least one sweetener, glycerin, citric acid, vitamins, coloring agents, and combinations thereof, wherein the filling layer exhibits a resistant heat stability of greater than about 90%, the filling layer disposed between the first and second dough layers and extending substantially to all of the edges of the first and second dough layers, wherein the filling is visible at all of the edges of the first and second dough layers,
wherein the first and second dough layers each have a cracker texture wherein the weight required to break each of the first and second dough layers ranges between 0.09 kg and 1.40 kg, and wherein the thickness of the bar is less than 7 millimeters.

2. The baked snack bar of claim 1, further comprising a topping composition comprising oats.

3. The baked snack bar of claim 1, wherein none of the filling layer, first dough layer or second dough layer contains shortening that includes trans fat.

4. The baked snack bar of claim 1, wherein the bar has a moisture content of between about 8% and 10%.

5. The baked snack bar of claim 1, wherein the filling layer comprises a water activity of between 0.56 and 0.65.

6. The baked snack bar of claim 1, wherein the filling layer comprises between about 75% and 80% solids.

7. The baked snack bar of claim 1, wherein the inclusion pieces comprise a material selected from the group consisting of raisins, dried cranberries, dried apple pieces, dried tomato pieces, and mixtures thereof.

8. The baked snack bar of claim 1, wherein the fruit comprises strawberry and/or apple.

9. A method for making a baked snack bar comprising:
providing a first calibrated dough layer and a second calibrated dough layer;
depositing a filling on the second calibrated dough layer, the filling comprising a plurality of solids provided only by components selected from the group consisting of at least one fruit, starch, modified starch, pectin, inclusion pieces, at least one sweetener, glycerin, citric acid, vitamins, coloring agents and combinations thereof, and comprising a resistant heat stability of at least 90%;
placing the first calibrated dough layer on top of the filling to form a laminate;
calibrating the laminate to reduce the thickness of the laminate to less than 4 millimeters;
cutting the laminate into bars; and
baking the bars for a predetermined amount of time, the step of baking comprising baking the bars at an initial temperature of about 95° C. followed by increasing the temperature to between about 210-220° C. over the predetermined amount of time;
wherein the filling is visible and extends substantially to all of the edges of the first and second dough layers of the baked bars, and wherein the filling is visible at all of the edges of the first and second dough layers.

10. The method of claim 9, wherein the baked bar has a moisture content of between about 8% and 10%.

11. The method of claim 9, wherein the filling comprises fruit.

12. The method of claim 9, wherein the first calibrated dough layer covers the filling.

13. The method of claim 9, wherein the bars are baked for a time of approximately 11 minutes.

14. The method of claim 9, further comprising the step of molding a design on the surface of the laminate.

15. The method of claim 9, further comprising the step of docking holes in the first and second calibrated dough layers.

16. The method of claim 9, wherein the first and second dough layers each have a cracker texture wherein the weight required to break each of the first and second dough layers ranges between 0.09 kg and 1.40 kg.

* * * * *